UNITED STATES PATENT OFFICE 2,189,595

WELDING PROCESS

Edward F. Smith, Chicago, Ill., assignor to Haynes Stellite Company, a corporation of Indiana No Drawing. Application May 20, 1937, Serial No. 143,725

1 Claim. (Cl. 219—10)

This invention relates to the deposition of molten metal by fusion-deposition welding methods.

In many fusion-deposition welding processes, including particularly the deposition of hard, wear-resistant metal from a welding rod onto a softer, tougher metal article—an operation commonly called "hard surfacing"—it is necessary to preheat the article to be surfaced and to maintain it at a relatively high temperature throughout the entire operation in order to prevent stresses which would cause the article to crack. Sometimes, the article to be surfaced is heated to the desired temperature in a furnace, and then removed from the furnace and hard surfaced in the open air. This procedure has all the disadvantages inherent in every intermittent heating process. The article begins to cool immediately upon its removal from the furnace, and may have to be reheated many times before the hard surfacing can be completed. The method wastes time and labor, and fails to provide a uniform body temperature during hard surfacing.

Another procedure for hard surfacing comprises building a furnace around the article to be surfaced and welding within the furnace. Although this method avoids some of the disadvantages of the previously described method, it is by no means perfect. The furnace is usually crude, wastes heat, and fails to provide uniform heating. The welder is exposed to excessive heat, and it is difficult and often impossible to reach all of the parts to be hard surfaced or otherwise welded.

Objects of this invention are to provide an improved welding process, for instance a process for hard surfacing metal articles, which process is free from the disadvantages of the methods heretofore used; to provide and continuously maintain a substantially uniform high temperature in the article throughout the welding operation; to render all parts of the heated article accessible for hard surfacing or welding; to avoid subjecting the welder to excessive heat; and to allow the heating of only those parts of an article which it is desired to weld or hard surface.

These and other objects are accomplished, according to this invention, by electrically heating the metal articles, or parts thereof, independently of the welding heat. In heating by this method, an electric current of sufficient strength to raise the temperature of the article to the desired degree by resistance or ohmic heating may be passed through the article or portion thereof to be welded or hard surfaced.

In applying the invention, there should be provided a suitable source of alternating or direct electric current; means for varying and controlling the current, for example, a variable resistance or reactance; and suitable leads for connecting the current source to the portion of the article to be heated. The temperature of the article may be controlled by the amount of current used, and the hard surfacing operation may be carried on while the current is flowing, thus insuring the maintenance of a substantially uniform temperature in the article throughout the operation, thereby eliminating the likelihood of stresses occurring therein.

In order to render all parts accessible, the article may be rotatably mounted, and if it is desired to heat only certain portions of the article, this may readily be accomplished by connecting the current supply leads only to the specified area.

The welding or hard surfacing metal may be applied to the surface of the heated article by fusing and depositing metal from a metal welding rod in an electric arc or an oxyacetylene or other high temperature flame. In many instances it is preferable intermittently to heat and reheat the article or part after such article or part has been raised to the desired hard surfacing temperature and during the deposition thereon of the molten hard surfacing metal. This may be accomplished either by manual control or by an automatic mechanism for periodically turning the heating current on for say 15 seconds, then off for 15 seconds, and so on until the operation has been completed. Intermittent application of the heating current in this manner is advantageous because the hard surfacing metal often is applied successively to comparatively small areas of the surface of the heated article. The localized heat of the arc or the heating flame that melts the hard surfacing rod metal, as well the molten metal, heats such areas to a considerably higher temperature than the rest of the part being hard surfaced; and consequently the temperatures of certain portions of the article will differ. An intermittent flow of heating current through the article tends to maintain a more exactly uniform temperature throughout the article than a continuously flowing current, since it is necessary in some instances to cut off the continuously flowing current at either frequent or infrequent periods to balance the added heat derived from the hard facing flame or arc and then reheat the article again as soon as the average temperature drops due to the heat dissipated from the article while the current is off.

A specific example of a successful application of the invention will serve to illustrate the method more clearly. A crankshaft, of which the main and crank bearings were to be surfaced with a wear-resistant alloy of the cobalt-chromium-tungsten type, was connected to the two terminals of a transformer. A current of about 6700 amperes was passed through the shaft, at a voltage between 3 and 10 volts, whereby the temperature of the shaft was raised to between about 700° F. and 900° F. and maintained at a substantially uniform temperature during the hard surfacing operation. An oxy-acetylene flame was thereupon applied to a welding rod comprising an alloy of the cobalt-chromium-tungsten type, the rod was fused, and the molten metal was deposited, in the usual manner of welding, on successive portions of the so-heated bearings to complete the hard surfacing operation.

This invention is especially advantageous for hard surfacing articles, such as shafts, bearings, die blocks, and cutting blades, which are subject to considerable wear; but it will be evident that the principles disclosed are of general application in depositing metal on a metal workpiece which is heated electrically and onto which the weld metal is fusion deposited by a high temperature heating medium independent of the means for electrically heating the workpiece.

And while the method of electrically heating the workpiece has been described with particular reference to heating by ohmic heating, it is evident that it is possible and often advantageous to heat the article by induction or high frequency electrical methods.

What is claimed is:

Process of hard surfacing a metal article which comprises passing an intermittently interrupted heating current of a periodicity of about 15 seconds through said article said current being of sufficient magnitude to raise the temperature of the article to a preheat temperature between about 700° F. and 900° F.; applying a high temperature gas flame to a welding rod composed of hard surfacing metal of the cobalt-chromium-tungsten type and to a relatively small portion only of the surface of said article; melting a portion of said rod by means of said flame, and depositing said melted portion of rod on said portion of the surface of said article; and continuing the passing of said intermittently interrupted electric current through the article during the deposition of molten rod metal whereby the heat intermittently applied to said article by said electric current and the heat applied by the gas flame is allowed to distribute itself throughout the article to substantially uniformly heat the article.

EDWARD F. SMITH.